United States Patent [19]
Kato et al.

[11] Patent Number: 4,727,418
[45] Date of Patent: Feb. 23, 1988

[54] IMAGE PROCESSING APPARATUS

[75] Inventors: Tadashi Kato; Yutaka Takahashi; Masahide Kanno; Masahiko Sasaki, all of Hachioji, Japan

[73] Assignee: Olympus Optical Co., Ltd., Tokyo, Japan

[21] Appl. No.: 876,807

[22] Filed: Jun. 20, 1986

[30] Foreign Application Priority Data

Jul. 2, 1985 [JP] Japan .................. 60-144931

[51] Int. Cl.[4] .............................. H04N 7/18
[52] U.S. Cl. ........................ 358/98; 358/183
[58] Field of Search ............... 358/98, 93, 183, 22, 358/100, 111, 160

[56] References Cited

U.S. PATENT DOCUMENTS

| | | | |
|---|---|---|---|
| 3,835,248 | 9/1974 | Pieters | 358/183 X |
| 4,334,245 | 6/1982 | Michael | 358/183 |
| 4,357,624 | 11/1982 | Greenberg | 358/22 |
| 4,409,618 | 12/1983 | Inaba | 358/22 X |
| 4,475,124 | 10/1984 | Ankeny et al. | 358/183 |
| 4,533,937 | 8/1985 | Yamamoto et al. | 358/22 |
| 4,568,981 | 2/1986 | Beaulier | 358/22 X |
| 4,621,284 | 11/1986 | Nishioka et al. | 358/98 |
| 4,626,837 | 12/1986 | Priestly | 358/183 X |

FOREIGN PATENT DOCUMENTS

| | | |
|---|---|---|
| 2448578 | 4/1975 | Fed. Rep. of Germany . |
| 59-151591 | 8/1984 | Japan . |
| 60-128393 | 8/1985 | Japan . |

OTHER PUBLICATIONS

"An Abdominal Camera for the Continuous Video Recording of Sheep Ovary Images . . . " Benoit et al., *IEEE Transactions on Biomedical Engineering*, vol. BME-25, No. 2, Mar. 78.

Primary Examiner—James J. Groody
Assistant Examiner—Victor K. Kostak
Attorney, Agent, or Firm—Frishauf, Holtz, Goodman & Woodward

[57] ABSTRACT

An electronic scope including a solid-state image pickup device arranged at a distal end of an endoscope and having an image pickup area whose aspect ratio is 1:1, an image processing circuit for masking the image signal output from the image pickup device, and a display device having a screen whose aspect ratio is 3:4. The image processing circuit has frame memories for storing one-frame image signals, a mask signal generator for generating a mask pattern signal, and a gate for permitting/inhibiting supply of the image signal from the frame memories to the display device in response to the mask pattern signal from the mask signal generator.

12 Claims, 20 Drawing Figures

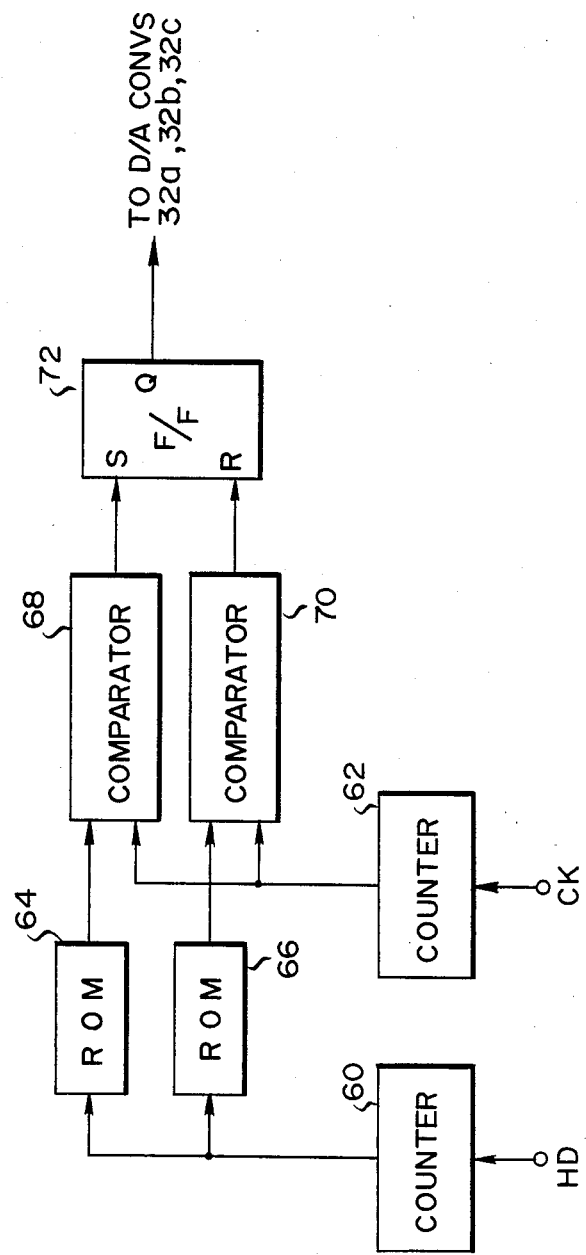
F I G. 2

FIG. 6
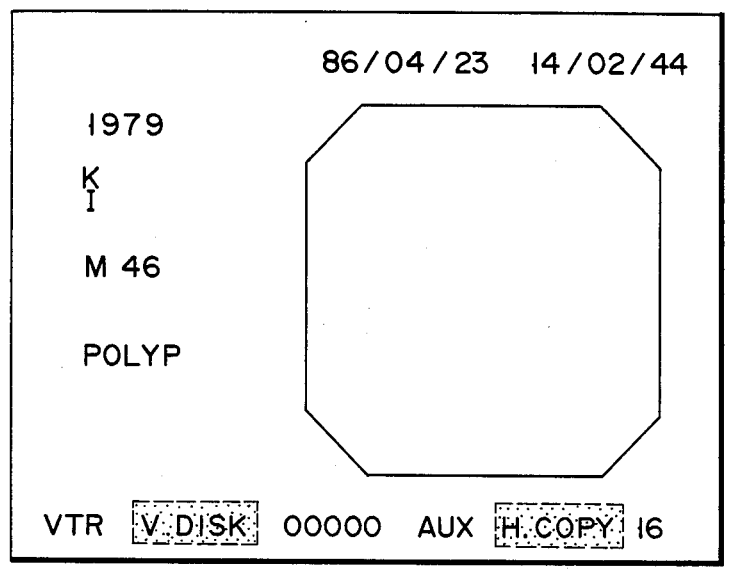
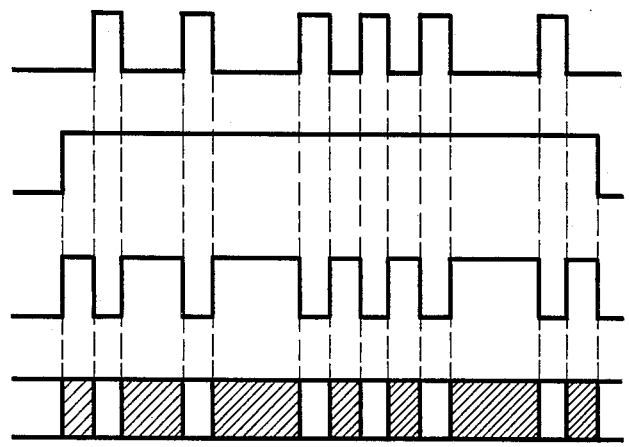
FIG. 7A
(CHARACTER PATTERN)
FIG. 7B
(BACKGROUND PATTERN)
FIG. 7C
(SUPERIMPOSED SIGNAL)
FIG. 7D
(DISPLAY)

F I G. 12
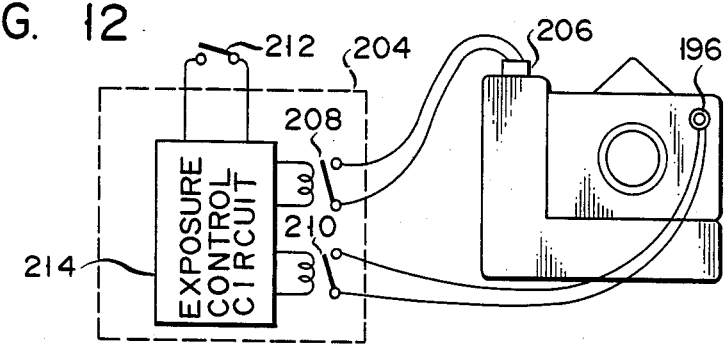
F I G. 13
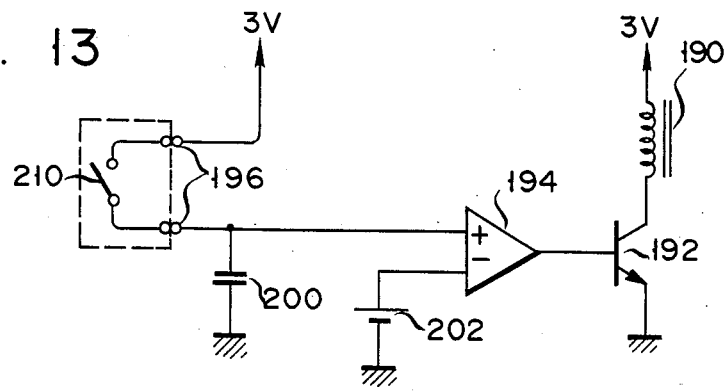
F I G. 14A
(RELEASE SW)
F I G. 14B
(REMOTE SW)
F I G. 14C
(EXPOSURE)
F I G. 14D
(ADAPTER SW)

4,727,418

IMAGE PROCESSING APPARATUS

BACKGROUND OF THE INVENTION

The present invention relates to an image processing apparatus for masking an image.

Along with the development of solid-state image pickup devices in a variety of application fields, image processing has been performed using a pickup image. Although in a conventional endoscopic observation a fiber scope is used through which a doctor observes an optical image of the examined object through an eyepiece in order to diagnose the problem, an electronic scope incorporating a solid-state image pickup device such as a charge-coupled device (CCD) at the distal end of the endoscope has recently been used to monitor the image of an object through an external monitor. The doctor can then diagnose an object while observing its image on the monitor.

An example of such an electronic scope is described in Japanese Patent Disclosure (Kokai) No. 59-151591. Since the quality of the peripheral portion of the image produced by a solid-state image pickup device such as a CCD is poor, an optical aperture is formed in front of the device. The peripheral portion of the image is then masked and is not displayed on the screen. However, when an optical aperture is formed in front of the solid-state image pickup device, the peripheral image portion is distorted due to diffraction, a boundary between the masked and nonmasked image portions is blurred, and a displayed image cannot be clearly observed. As a result, the effect of masking is degraded.

In addition, in order to change the shape of the aperture when the optical aperture is used, it must be completely replaced with another one, with the accompanying difficulties.

SUMMARY OF THE INVENTION

It is an object of the present invention to provide an image processing apparatus for accurately masking the peripheral portion of the image picked up by the image pickup device, in both a desired shape and producing a clear image.

In order to achieve the above object of the present invention, there is provided an image processing apparatus comprising a frame memory for storing a one-frame image signal, a mask signal generator for generating a mask pattern signal, and a gate circuit for gating the image signal from the frame memory in response to a mask pattern signal from the mask signal generator.

BRIEF DESCRIPTION OF THE DRAWINGS

FIG. 2 is a block diagram showing the detailed arrangement of a mask signal generator of the first embodiment;

FIG. 6 shows a display example of the second embodiment;

FIGS. 7A to 7D are timing charts for explaining superimposing of characters on a pickup image and a character background in the second embodiment;

FIG. 12 is a block diagram of a camera as a still image filing device obtained by improving the exposure control circuit;

FIG. 13 is a circuit diagram of the camera exposure control circuit in FIG. 12; and FIGS. 14A to 14D are timing charts for explaining the operation of the exposure control circuit in FIG. 13.

DETAILED DESCRIPTION OF THE PREFERRED EMBODIMENTS

Image processing apparatuses according to preferred embodiments of the present invention will be described with reference to the accompanying drawings.

Figure 1:
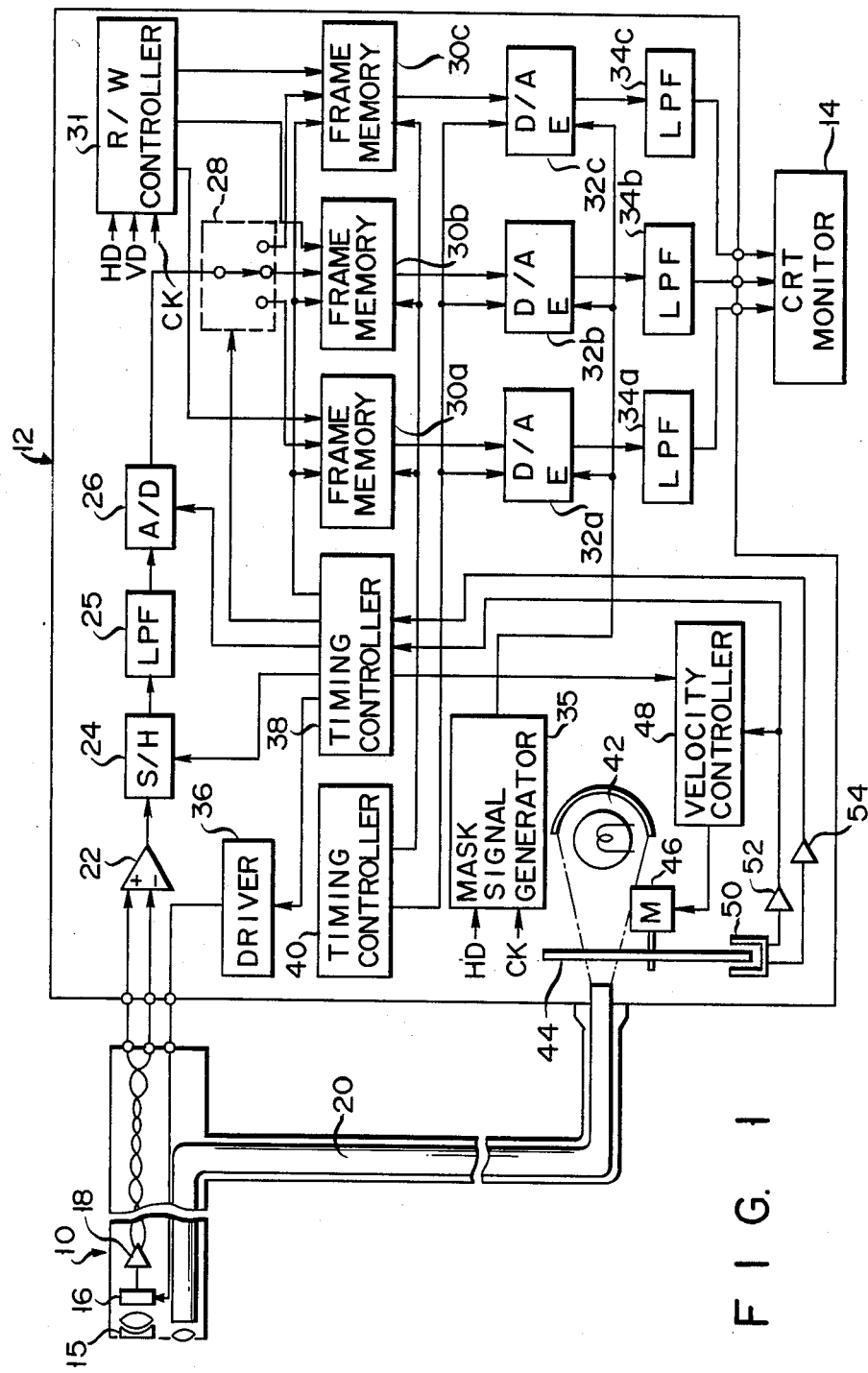
FIG. 1 is a block diagram of an image processing apparatus according to a first embodiment of the present invention.

FIG. 1 is a block diagram of the first embodiment. The first embodiment exemplifies an electronic scope system incorporating a charged-coupled device (CCD) at the distal end of an endoscope for picking up the image of an object being examined and displaying the object image on a monitor. This system includes electronic scope 10, video processor unit 12, and CRT monitor 14. Scope 10 may be either a medical endoscope for observing a body cavity or an industrial endoscope for observing the inside of a small tubular member inside a machine. Processor unit 12 serves as a video processor and light source.

CCD 16 is arranged at the distal end of scope 10 to pick up an image of an object through objective lens 15. Since the distal end of the scope is very narrow, CCD 16 includes a charge storage portion (i.e., an image pickup portion) and an information read transfer portion. However, a light-shielding portion serving as a shutter is not provided in CCD 16. The shutter function is included within video processor unit 12 (to be described in detail later). An output signal from CCD 16 is supplied as a two-phase signal to common mode rejection (CMR) amplifier 22 in processor unit 12 through preamplifier 18.

Electronic scope 10 also includes light guide 20, a bundle of optical fibers. One end of light guide 20 is connected to processor unit 12, and the other end thereof is guided to the distal end of scope 10. Light from unit 12 is emitted onto the object through the light guide 20.

An output from CMR amplifier 22 is written in one of frame memories 30a, 30b, 30c through sample/hold (S/H) circuit 24, low-pass filter (LPF) 25, analog/digital (A/D) converter 26, and multiplexer 28. Multiplexer 28 is switched to respectively write red (R), green (G), and blue (B) component image signals constituting one frame in frame memories 30a, 30b, and 30c.

Outputs from frame memories 30a, 30b, and 30c are respectively output through digital/analog (D/A) converters 32a, 32b, and 32c and low-pass filters (LPFs) 34a, 34b, and 34c, and appear at R, G, and B signal output terminals. The R, G, and B signals are mixed and displayed on CRT monitor 14. An aspect ratio of the image pickup portion of CCD 16 is 1:1 (e.g., 512×512 pixels), and the address structures of memories 30a, 30b, and 30c are determined accordingly. However, an aspect ratio of the screen of CRT monitor 14 is 3:4. The masked image (stored in frame memories 30a, 30b, and 30c) picked up by CCD 16 is not displayed on the entire screen of CRT monitor 14, but is concentrated on the central portion by reading out the storage images from frame memories 30a, 30b, and 30c in synchronism with the scanning of the CRT monitor 14 screen. Read/write (R/W) controller 31 is connected to frame memories 30a, 30b, and 30c. R/W controller 31 receives clock pulse CK as a reference pulse for the operations of the constituting circuits and horizontal and vertical synchronizing pulses HD and VD from the CRT monitor 14.

D/A converters 32a, 32b, and 32c respectively have output enable terminals E. Only if terminals E are set at logic "1", converters 32a, 32b, and 32c output analog signals corresponding to input digital signal levels. However, if terminals E are set at logic "0", output levels are at the 0 (black) level. An output signal from mask signal generator 35 is connected to output enable terminals E of D/A converters 32a, 32b, and 32c.

The detailed arrangement of mask signal generator 35 is shown in FIG. 2. In generator 35, horizontal synchronizing pulse HD is supplied to counter 60, and clock pulse CK is supplied to counter 62. Although not illustrated, counters 60 and 62 are cleared in response to vertical and horizontal synchronizing pulses VD and HD, respectively. An output from counter 60 is supplied to address terminals of read-only memories (ROMs) 64 and 66. An output from counter 62 is supplied to the first input terminals of comparators 68 and 70. Mask pattern data (to be described later) is stored in ROMs 64 and 66. Outputs from ROMs 64 and 66 are supplied to the second input terminals of comparators 68 and 70, respectively. Outputs from comparators 68 and 70 are supplied to set and reset input terminals of flip-flop (F/F) 72, respectively. An output from F/F 72 is supplied to terminals E of D/A converters 32a, 32b, and 32c.

It should be noted that driver 36 is arranged in video processor unit 12 to generate clock pulses for driving CCD 16.

The timings of the constituting circuits in video processor unit 12 are controlled by timing controllers 38 and 40. The write rate of frame memories 30a, 30b, and 30c is different from the read rate thereof. More specifically, the write operation of frame memories 30a, 30b, and 30c is controlled by generator 38 such that write timing is synchronized with the image pickup rate of CCD 16. However, the read operation of frame memories 30a, 30b, and 30c is controlled by timing controller 40 such that read timing is synchronized with the display rate of CRT monitor 14. Timing generator 38 is connected to S/H circuit 24, A/D converter 26, multiplexer 28, frame memories 30a, 30b, and 30c, and driver 36. Timing generator 40 is connected to frame memories 30a, 30b, and 30c, and D/A converters 32a, 32b, and 32c.

Video processor unit 12 includes lamp 42 (e.g., a xenon lamp) as a light source. Light from lamp 42 is incident on light guide 20 through rotary filter 44.

Figure 3:
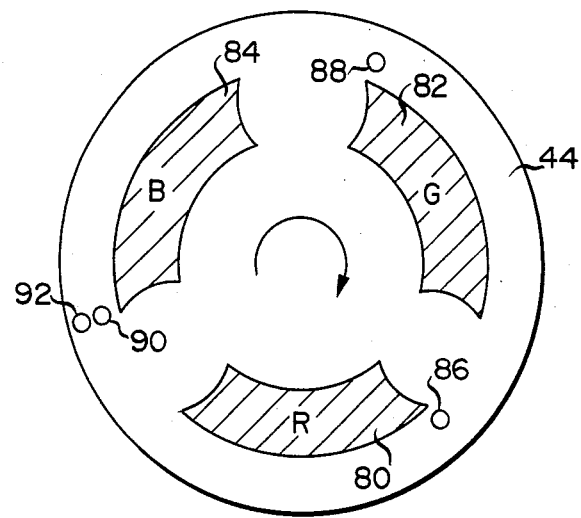
FIG. 3 is a plan view of a rotary filter of the first embodiment.

Rotary filter 44 sequentially colors light into R, G, and B beams so as to obtain a frame sequential imaging system. As shown in FIG. 3, filter 44 comprises a disc with R, G, and B filter components 80, 82, and 84 arranged at angular intervals. Disc portions between filter components 80, 82, and 84 serve as a shutter for shielding light incident on light guide 20 so as to allow read out of signals from CCD 16. Read pulse generation through holes 86, 88 and 90 are formed outside the leading portion of filter components 80, 82, and 84 along the rotational direction of filter 44. Start pulse generation through hole 92 is formed outside the trailing portion of B filter component 84 along the rotational direction of filter 44.

Rotary filter 44 is driven by motor 46 PLL-controlled by velocity controller 48. Photocoupler 50 consists of light-emitting and light-receiving elements which sandwich rotary filter 44 therebetween. Photocoupler 50 is adapted to generate read and start pulses upon detection of through holes 86, 88, 90, and 92. The start pulse from photocoupler 50 is supplied to timing controller 38 and velocity controller 48 through amplifier 52. The read pulse from photocoupler 50 is supplied to timing controller 38 through amplifier 54.

The operation of the first embodiment will be described below. Velocity controller 48 comprises a reference signal generator for generating a synchronizing pulse (e.g., a 1/30 second-interval pulse) serving as a rotation control reference for rotary filter 44. Motor 46 (and therefore rotary filter 44) can be rotated at a velocity synchronized with the synchronizing pulse. Upon rotation of rotary filter 44, R, G, and B color filters 80, 82, and 84 are sequentially inserted in the optical path of light incident on light guide 20. As a result, illumination light is sequentially colored in R, G, and B in-between light-shielding periods.

The read pulse is generated at the end of each R, G, or B coloring period. The start pulse is generated at the end of B coloring. Velocity controller 48 controls the velocity of motor 46 to be synchronized with the start pulse.

While illumination light is being colored in R, G, and B, charges corresponding to respective color component images are charged in CCD 16. Therefore, the respective color component images are picked up.

The charges are read out during the light-shielding periods after R, G, and B coloring. More specifically, the storage charges are read out from CCD 16 in response to the read pulses generated at the ends of R, G, and B component illumination periods. These readout charges are respectively stored in frame memories 30a, 30b, and 30c.

In this embodiment, all outputs from frame memories 30a, 30b, and 30c are not supplied to CRT monitor 14 so as to mask the peripheral portion of the image, as previously mentioned. Only image signals representing a desired region (from among all signals read out from frame memories 30a, 30b, and 30c) is supplied to CRT monitor 14 through D/A converters 32a, 32b, and 32c. Even if an image signal representing an area excluding the desired region is read out from frame memories 30a, 30b, and 30c, it is not converted by D/A converters 32a, 32b, and 32c to an analog signal. Such image data is output as a black signal.

Figure 4:
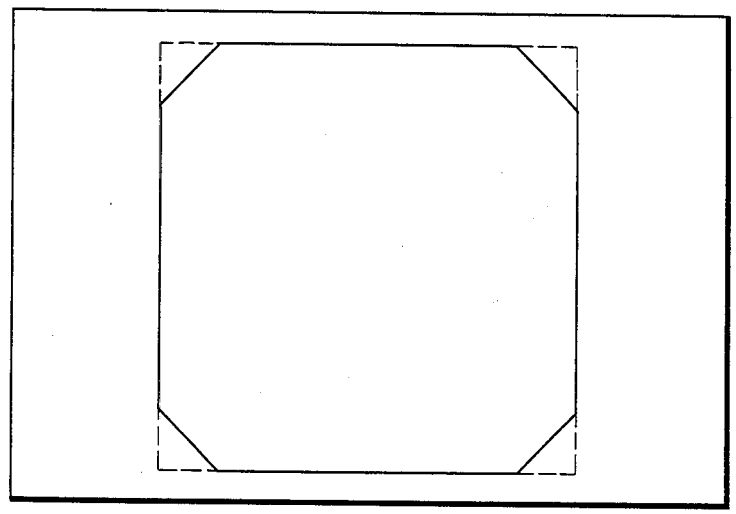
FIG. 4 shows a display example of the first embodiment.

Horizontal synchronizing pulses HD are counted by counter 60 in mask signal generator 35. Counter 60 detects the scanning line number of currently displayed data. ROM 64 stores mask data for determining the display start pixel of each scanning line (representing the left end of the image display area), i.e., the mask end pixel. ROM 66 stores mask data for determining the display end pixel of each scanning line (representing the right end of the image display area), i.e., the mask restart pixel. Mask data for only the horizontal scanning line currently displayed on the screen of the CRT monitor 14 is read out from ROMs 64 and 66 in response to the output from counter 60. Counter 62 counts read clock pulses CK for frame memories 30a, 30b, and 30c, and detects the presently displayed pixel number of the horizontal scanning line. Comparators 68 and 70 respectively compare mask data from ROMs 64 and 66 with data representing the presently displayed pixel number, output from counter 62. If the mask data coincides with the presently displayed pixel data, comparators 68 and 70 output detection signals. More specifically, comparator 68 outputs a detection signal at a timing corresponding to the left end of the image display area, and comparator 70 outputs a detection signal at a timing corresponding to the right end thereof. The outputs from comparators 68 and 70 respectively set and reset F/F 72. F/F 72 supplies an output signal of level "1" to enable terminals E of D/A converters 32a, 32b, and 32c from the timing corresponding to the left end of the image display area to the timing corresponding to the right end thereof. If octagonal mask pattern data is stored in ROMs 64 and 66, as shown in FIG. 4, a square image indicated by the broken line of FIG. 4 is output from frame memories 30a, 30b, and 30c, but D/A converters 32a, 32b, and 32c supply only the octagonal image portion (minus the corners of the entire square image) to the CRT monitor 14. The background portion (excluding the octagonal portion) is supplied as a black image from D/A converters 32a, 32b, and 32c to CRT monitor 14.

According to the first embodiment, the image picked up by CCD 16 is masked according to the mask pattern data stored in ROMs 64 and 66, and only a desired image portion is displayed. Image masking is not performed using an optical aperture but is performed electronically during signal processing. The peripheral portion of the masked image is therefore not distorted by diffraction or the like, thus improving the masking effect. In addition, mask data is prepared for each horizontal scanning line so that the masked image shape is not limited to a rectangular shape but can be extended to any shape. The masked image shape can be easily changed by modifying the data in ROMs 64 and 66. It is convenient to constitute ROMs 64 and 66 with EE-PROMs (Electrically Erasable Programmable Read Only Memories).

Figure 5:
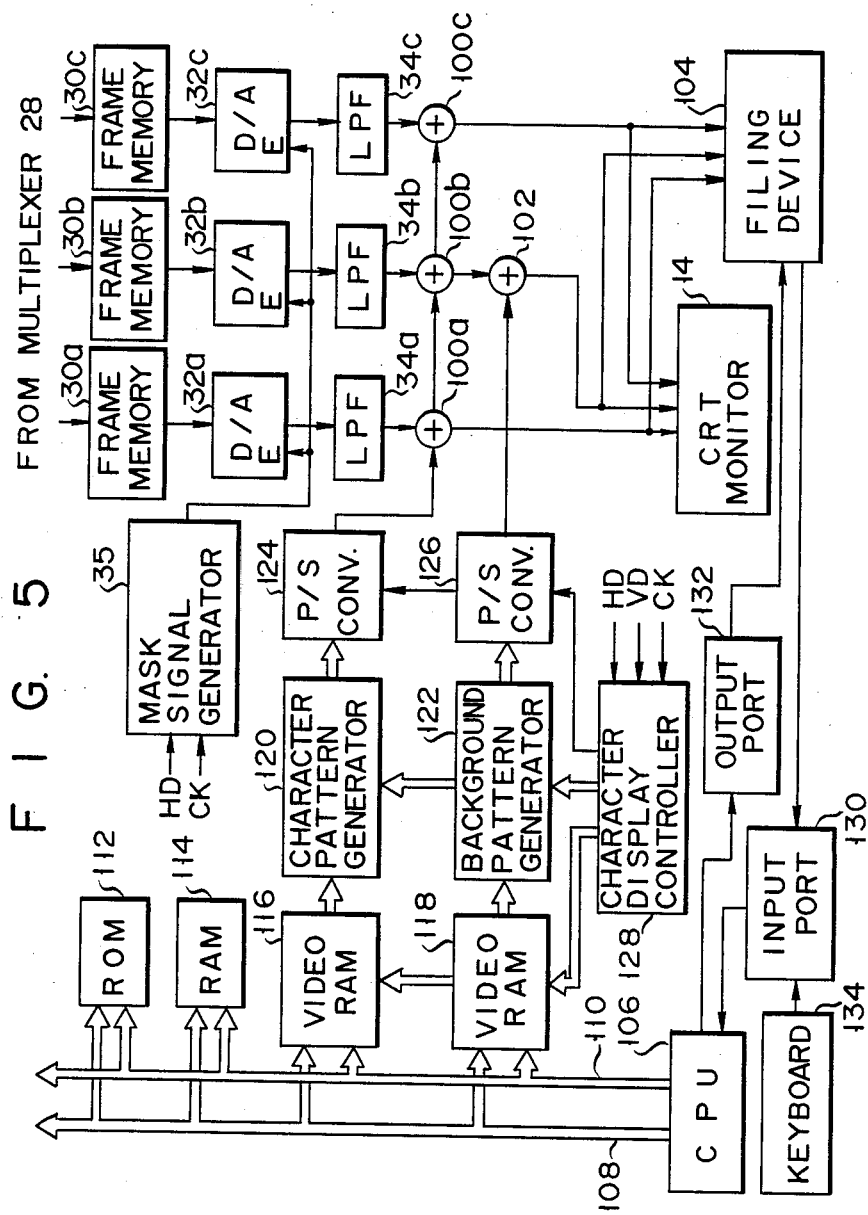
FIG. 5 is a block diagram of an image processing apparatus according to a second embodiment of the present invention.

A second embodiment of the present invention will be described below. FIG. 5 is a block diagram of an image processing apparatus according to the second embodiment. A description of common elements in the first and second embodiments is omitted. In the first embodiment, the masked image of the object to be examined is simply displayed on the CRT monitor. However, in the second embodiment, when an image having an aspect ratio of 1:1 is displayed on a monitor having an aspect ratio of 3:4, character data is superimposed in the blank portion of the monitor screen.

In this embodiment, outputs from LPFs 34a, 34b, and 34c are superimposed on the character pattern by adders 100a, 100b, and 100c. After the output as the G component from LPF 34b is superimposed on the character pattern, the resultant pattern is further superimposed on a character background pattern by adder 102. "Character background" here means a portion without dots constituting a character in a character display area (designated by row and column) on the screen. Outputs from adders 100a, 102, and 100c are supplied to CRT monitor 14 and filing device 104 as a still image recording device. Filing device 104 records one-frame image data in a recording medium such as an optical disk or a magnetic disk. The still image recording device may be a camera for photographing a CRT monitor image, a color image recorder, a video printer, a video tape recorder (VTR), or the like.

ROM 112, RAM 114, and video RAMs 116 and 118 are connected to CPU 106 through address bus 108 and data bus 110. Video RAMs 116 and 118 each have an address space corresponding to one frame of CRT monitor 14. Character code data and character background code data are respectively stored in predetermined memory areas of video RAMs 116 and 118 under the control of CPU 106. Character code data and character background code data output from video RAMs 116 and 118 are respectively supplied to character pattern generator 120 and background pattern generator 122, and are converted thereby to character and character background patterns, respectively. The character and character background patterns from generators 120 and 122 are supplied to parallel/serial (P/S) converters 124 and 126, respectively. RAMs 116 and 118, generators 120 and 122, and converters 124 and 126 are controlled by character display controller 128. Controller 128 receives clock pulse CK, horizontal synchronizing pulse HD, and vertical synchronizing pulse VD.

CPU 106 is connected to input and output ports 130 and 132. Keyboard 134 and filing device 104 are connected to CPU 106 through input port 130. A connection detection signal is supplied from filing device 104 to CPU 106. Filing device 104 receives a remote release signal from CPU 106 through output port 132.

The operation of the image processing apparatus according to the second embodiment of the present invention will be described. As shown in FIG. 6, the screen of CRT monitor 14 is controlled in the second embodiment. Storage images of frame memories 30a, 30b, and 30c are read out in synchronism with scanning of the screen of CRT monitor 14, to be displayed not in a central square area of the screen but in a right central square area thereof. Various characters are displayed in other portions of the screen (i.e., a left portion, an upper right portion, a lower right portion, and the like). Since the image is displayed at the right half of the screen, the number of characters displayed in each line can be increased so that readability of information can be improved. The reason why the image is displayed on the right half of the screen is based on the general assumption that characters are input from the left end in personal computers. Date (86/04/23) and time (14/02/44) are displayed on the upper right portion of the screen. Patient ID code (1979), patient initials (K.I), sex (M), age (46), portion to be examined (polyp), and other comments are displayed on the left portion of the screen. Recording states (e.g, VTR V.DISK 00000, AUX, H.COPY 16) are displayed on the lower portion of the screen. In this embodiment, the image signal is recorded as a still image by video disk filing device 104. The number of recorded images (pickup images) (00000) is displayed as the recording state on the lower portion of the screen.

Character code data is input at keyboard 134 for a position corresponding to the display position of video RAM 116. The characters are input in an order of date, time, ID code, initial, sex, age, and the portion to be examined according to corresponding prompts. The cursor is located in the write start position. Each prompt is erased when the operator finishes inputting the corresponding information. The output from video RAM 116 is added to R, G, and B signals by adders 100a, 100b, and 100c so that the characters are displayed in white. Character display can be cancelled by clearing data from video RAM 116. This mode can be effectively utilized when a plurality of images are obtained for a single patient.

It is possible to display a character background (i.e, a portion without dots constituting the characters within the character display area accessed by row and column) in a color different from that of the image background (black) to emphasize the characters. This display mode can be applied to the character background for the name of the equipment connected as the still image filing device in the recording state display area. For this purpose, CPU 106 writes a character background code (in this case, a code for highlighting its display area) in the character display area for the equipment name according to the connection detection signal. A background pattern (FIG. 7B) is supplied to a one-line scanning character pattern (FIG. 7A). Adder 102 calculates an exclusive ORed product of the character pattern and the background pattern. As shown in FIG. 7C, a signal having pulses corresponding to only the character background portion is obtained. If display is performed in response to the signal in FIG. 7C, the character background portion is displayed in green on the monitor screen, as shown in FIG. 7D.

Various modifications of this embodiment will be described hereinafter.

Figure 8:
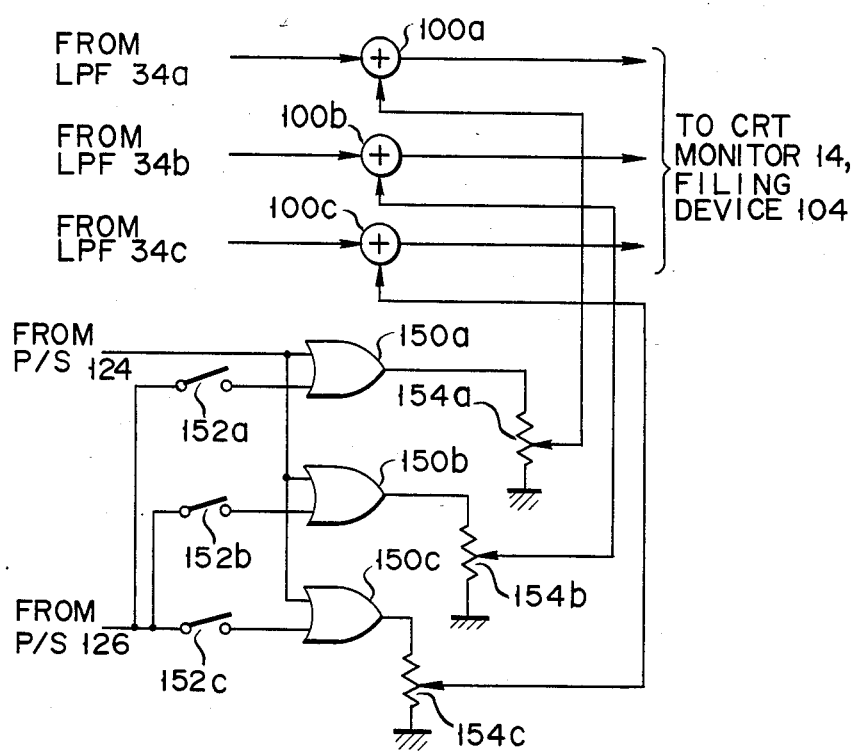
FIG. 8 is a circuit diagram showing a modification of the second embodiment allowing free coloring of the character and character background.

FIG. 8 shows a modification for displaying a character or character background in any color in the arrangement of the second embodiment. R, G, and B selection switches 152a, 152b, and 152c are respectively connected to the first input terminals of OR gates 150a, 150b, and 150c. A background pattern signal from P/S converter 126 (FIG. 5) is supplied to the first input terminals of OR gates 150a, 150b, and 150c through switches 152a, 152b, and 152c. A character pattern signal from P/S converter 124 (FIG. 5) is supplied to the second input terminals of OR gates 150a, 150b, and 150c. Outputs from OR gates 150a, 150b, and 150c are supplied to potentiometers 154a, 154b, and 154c. Outputs from potentiometers 154a, 154b, and 154c are supplied to adders 100a, 100b, and 100c (FIG. 5) and are added to the R, G, and B image signals, respectively.

In the circuit of FIG. 8, one or more of R, G, and B switches 152a, 152b, and 152c are closed to arbitrarily change the color of the character background. If outputs from potentiometers 154a, 154b, and 154c are controlled to change an addition ratio of R, G, and B, the character color can be arbitrarily changed. In addition, if switches 152a, 152b, and 152c are selectively closed for a given period of time, the character or character background can be partially displayed in different colors.

Figure 9:
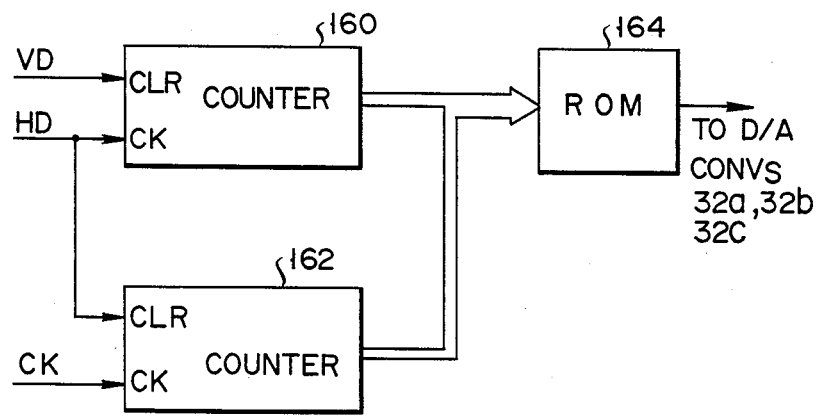
FIG. 9 is a block diagram showing a modification of the mask signal generator of the first and second embodiments.

FIG. 9 is a block diagram showing a modification of mask signal generator 35 of the first and second embodiments. Vertical synchronizing pulse VD is supplied to clear terminal CLR of counter 160, and horizontal synchronizing pulse HD is supplied to clock terminal CK of counter 160 and to clear terminal CLR of counter 162. Clock pulse CK is also supplied to clock terminal CK of counter 162. Outputs from counters 160 and 162 are supplied as X and Y address data to ROM 164. Data is programmed in ROM 164 such that an output therefrom becomes active in response to addresses for the image display area. The horizontal direction of the CRT monitor screen corresponds to the X direction, and the vertical direction thereof corresponds to the Y direction. As a result, ROM 164 outputs the same mask as that from F/F 72 in FIG. 2.

Figure 10:
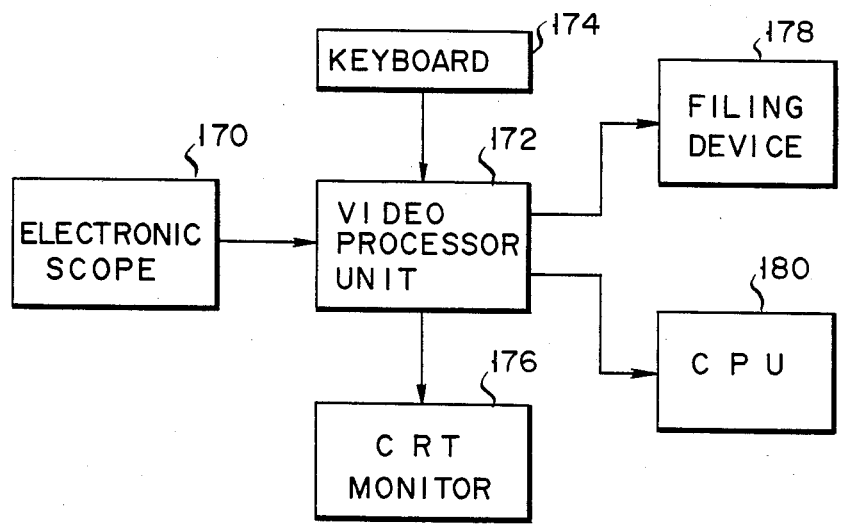
FIG. 10 is a block diagram of a retrieval system for a still image filed in an image filing device.

FIG. 10 shows another modification for simplifying retrieval of a still image after an image signal is recorded in a filing device as a still image recording device. Electronic scope 170 is connected to video processor unit 172, and an image signal from a solid-state image pickup device in scope 170 is recorded in filing device 178 and is also supplied to CPU 180. Keyboard 174 and CRT monitor 176 are connected to unit 172.

With this arrangement, retrieval data is supplied to CPU 180 when an image is stored as a still image in filing device 178, thereby controlling the retrieval data together with the recorded image. The image can be easily retrieved at high speed in response to the retrieval data. The retrieval data represents date, time, patient ID code, initial, sex, age, and other comments, as shown in FIG. 6.

Figure 11:
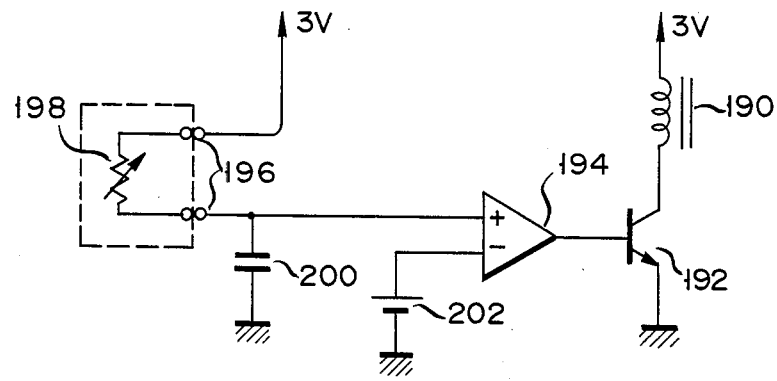
FIG. 11 is a circuit diagram of a camera exposure control circuit as a still image filing device.

An improvement in photographing time control of a normal camera or a camera incorporated in a color image recorder, as an example of the filing device 104 in FIG. 5, will be described below. The camera circuit shown in FIG. 11 is assumed. In this circuit, the drive start timing of a rear curtain varies to control exposure. Rear curtain solenoid 190 is connected between a power source terminal (3 V) and transistor 192. An output of comparator 194 is connected to the base of transistor 192. The power source terminal (3 V) is connected to capacitor 200 through variable resistor 198. A junction between resistor 198 and capacitor 200 is connected to the non-inverting input terminal of comparator 194. Reference power source 202 is connected to the inverting input terminal of comparator 194. Resistor 198 is detachably connected to the camera body through manual adapter terminal 196. If resistor 198 is detached from the camera body, the camera is operated in only the automatic exposure control mode. The power source terminal is set at 3 V when the shutter front curtain starts moving.

With this arrangement, a time for charging capacitor 200 to a predetermined voltage level corresponds to an exposure time. For this reason, exposure control is limited to a maximum of about one second. However, when a still image on a CRT screen is to be photographed, exposure time of about 15 seconds is required, thereby resulting in underexposure.

If exposure control unit 204 shown in FIG. 12, however, is connected to the camera, long-time exposure can be achieved. Unit 204 is connected to the camera body through manual adapter terminal 196 and remote release terminal 206 arranged on the film winder. Terminals 196 and 206 are respectively connected to adapter switch 210 and remote release switch 208. Switches 208 and 210 are relay switches closed by exposure control circuit 214. Release switch 212 is also connected to exposure control circuit 214.

The circuit diagram of the camera in FIG. 12 is shown in FIG. 13. This circuit is substantially the same as the conventional circuit, except that adapter switch 210 is connected between the power source terminal (3 V) and capacitor 200 in place of variable resistor 198 (FIG. 11).

The operation of the circuit in FIG. 13 will be described with reference to FIGS. 14A to 14D. If release switch 212 is closed, as shown in FIG. 14A, exposure control circuit 214 closes remote release switch 208, as shown in FIG. 14B. The shutter front curtain starts moving. As shown in FIG. 14C, film exposure is started. In this case, adapter switch 210 is kept open. Exposure control circuit 214 closes adapter switch 210, at a timing earlier than the film exposure time by a predetermined period of time, after the front curtain starts moving and the shutter is opened. Upon closing of adapter switch 210, capacitor charging is started. As shown in FIG. 14C, when a predetermined period of time has elapsed, transistor 192 and solenoid 190 are turned on to complete exposure. According to the arrangement described above, long exposure can be arbitrarily performed.

An instant camera can be used as filing device 104 in FIG. 5. In this case, the resultant photographs sequentially drop to the floor. A film rack is preferably provided.

The present invention is not limited to the particular embodiments described above. Various changes and modifications may be made within the spirit and scope of the invention. The above description has been made for electronic scope image display apparatuses. However, the present invention is not limited to such a particular application.

What is claimed is:

1. An image processing apparatus, comprising:
   frame memories for storing one-frame image signals;
   mask signal generating means for generating a mask pattern signal; and
   gating means for gating the image signal from said frame memories in response to the mask pattern signal from said mask signal generating means;
   wherein said mask signal generating means comprises
   a first read only memory for storing a display start point of each scanning line of the image,
   a second read only memory for storing a display end point of each scanning line,
   a first counter for counting the scanning lines of the image,
   a second counter for counting pixels of each scanning line, first and second comparators for comparing an output from said second counter with data read out at addresses of said first and said second read only memories, respectively, which are accessed by said first counter, and
   a flip-flop which is set/reset in response to outputs from said first and said second comparators.

2. An electronic scope image display apparatus, comprising:
   a solid-state image pickup device adapted to be arranged at a distal end of an endoscope;
   mask signal generating means for storing a mask pattern signal representing a mask pattern effective for blanking corner areas of a generally rectangular image;
   gating means for gating image data output from said image pickup device in response to the mask pattern signal from said mask signal generating means; and
   means for combining outputs from said gating means and character pattern data to produce a one-frame image and for displaying the one-frame image.

3. An image processing apparatus according to claim 2, in which said mask signal generating means comprises a first read only memory for storing a display start point of each scanning line of the image, a second read only memory for storing a display end point of each scanning line, a first counter for counting the scanning lines of the image, a second counter for counting the pixels of each scanning line, first and second comparators for respectively comparing an output from said second counter with data read out at addresses of said first and second read only memories which are accessed by said first counter, and a flip-flop which is set/reset in response to outputs from said first and second comparators.

4. An image processing apparatus according to claim 2, in which said gating means comprises an A/D converter having operation enable terminal for inhibiting signal output in response to the mask pattern signal from said mask signal generating means.

5. An image processing apparatus according to claim 2, which further comprises:
   character input means; and
   means for superimposing character data input at said character input means on image data output from said gating means.

6. An image processing apparatus according to claim 5, in which said superimposing means outputs a masked image on the right side of a frame, and characters on the left side of said frame.

7. An image processing apparatus according to claim 6, in which said superimposing means colors a character background and an image background in different colors.

8. An image processing apparatus according to claim 6, in which the characters input at said character input means are sequentially input to the left side of the frame.

9. An image processing apparatus according to claim 5, which further comprises means for selectively permitting/inhibiting character data superimposition.

10. An apparatus according to claim 2, wherein said solid-state image pickup device has a image pickup area whose aspect ratio is 1:1.

11. An apparatus according to claim 2, wherein said mask signal generating means stores a mask pattern signal representing an octagonal mask pattern.

12. An apparatus according to claim 2, wherein said combining and displaying means includes means for displaying the one-frame image on the right side of a screen and characters on the left side of said screen.

* * * * *